A. J. COON.
MACHINE FOR BINDING AND TYING PACKAGES.
APPLICATION FILED JULY 24, 1914.

1,326,030.

Patented Dec. 23, 1919.
7 SHEETS—SHEET 1.

FIG. 1.

Witnesses
B. M. Offutt,
B. M. Kent

Inventor
A. J. Coon
By Foster Freeman Watson Coit
Attorneys

A. J. COON.
MACHINE FOR BINDING AND TYING PACKAGES.
APPLICATION FILED JULY 24, 1914.

1,326,030.

Patented Dec. 23, 1919.
7 SHEETS—SHEET 3.

A. J. COON.
MACHINE FOR BINDING AND TYING PACKAGES.
APPLICATION FILED JULY 24, 1914.

1,326,030.  Patented Dec. 23, 1919.
7 SHEETS—SHEET 7.

Witnesses
Inventor
A. J. Coon.

UNITED STATES PATENT OFFICE.

ARTHUR J. COON, OF PROVIDENCE, RHODE ISLAND, ASSIGNOR OF ONE-HALF TO FRANCIS M. WILLIS, OF ITHACA, NEW YORK.

MACHINE FOR BINDING AND TYING PACKAGES.

1,326,030.     Specification of Letters Patent.     Patented Dec. 23, 1919.

Original application filed October 25, 1913, Serial No. 797,235. Divided and this application filed July 24, 1914. Serial No. 852,954.

*To all whom it may concern:*

Be it known that I, ARTHUR J. COON, a citizen of the United States, and resident of Providence, county of Providence, State of Rhode Island, have invented certain new and useful Improvements in Machines for Binding and Tying Packages, of which the following is a specification.

This application is a division of my prior application No. 797,235 filed October 25, 1913, on which Patent No. 1,132,165 was granted March 16, 1915, and relates particularly to the binding and tying mechanism shown and described therein.

The object of the present invention is to provide a binding and tying mechanism for passing one or more binders around an article or group of articles for securing a wrapper thereon or for securing a group of articles together.

The invention is shown and described in my aforesaid prior application in connection with a wrapping machine but it is obvious that it is capable of general application and in nowise limited to use with a wrapping machine.

The novel features of the invention will be apparent from the following description taken in connection with the accompanying drawings in which.

Figure 2:
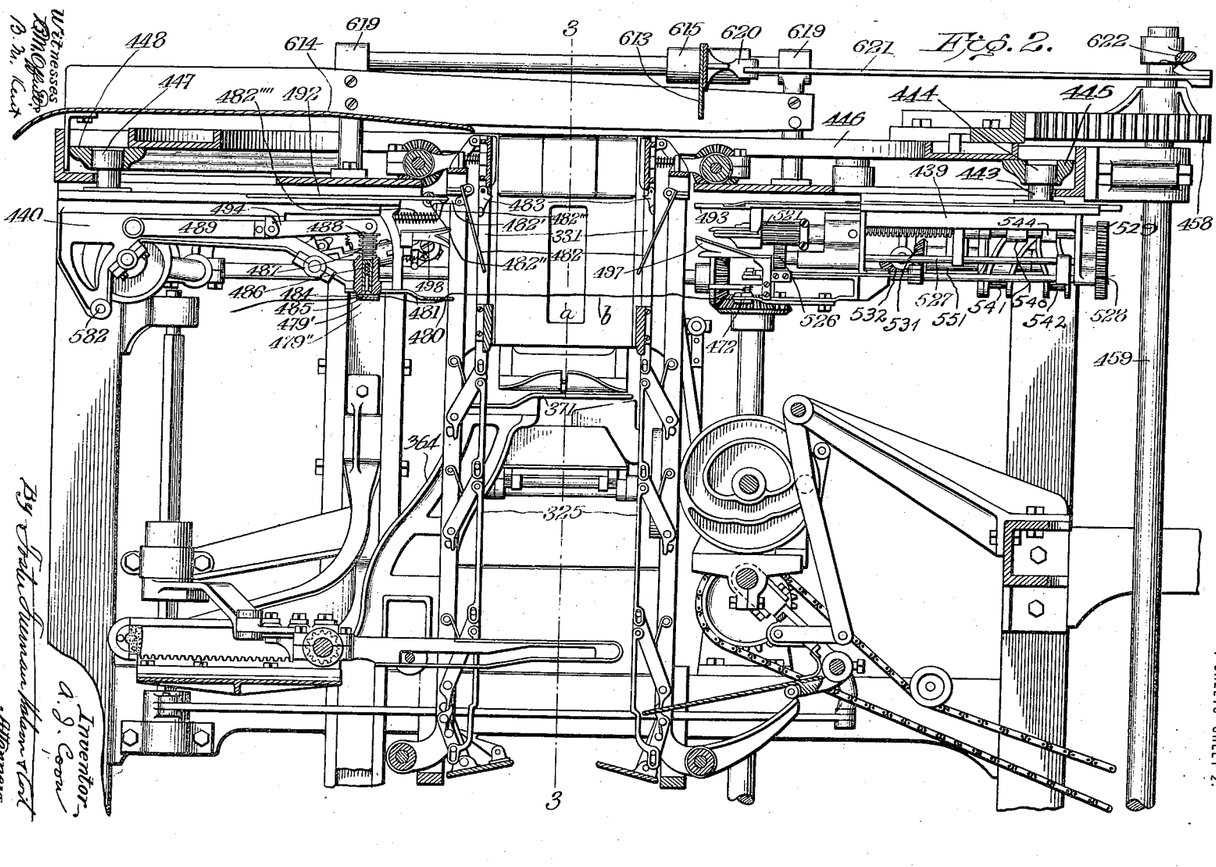
Fig. 2 is a central vertical section of the portion of said machine containing the binding and tying mechanism.
Figure 3:
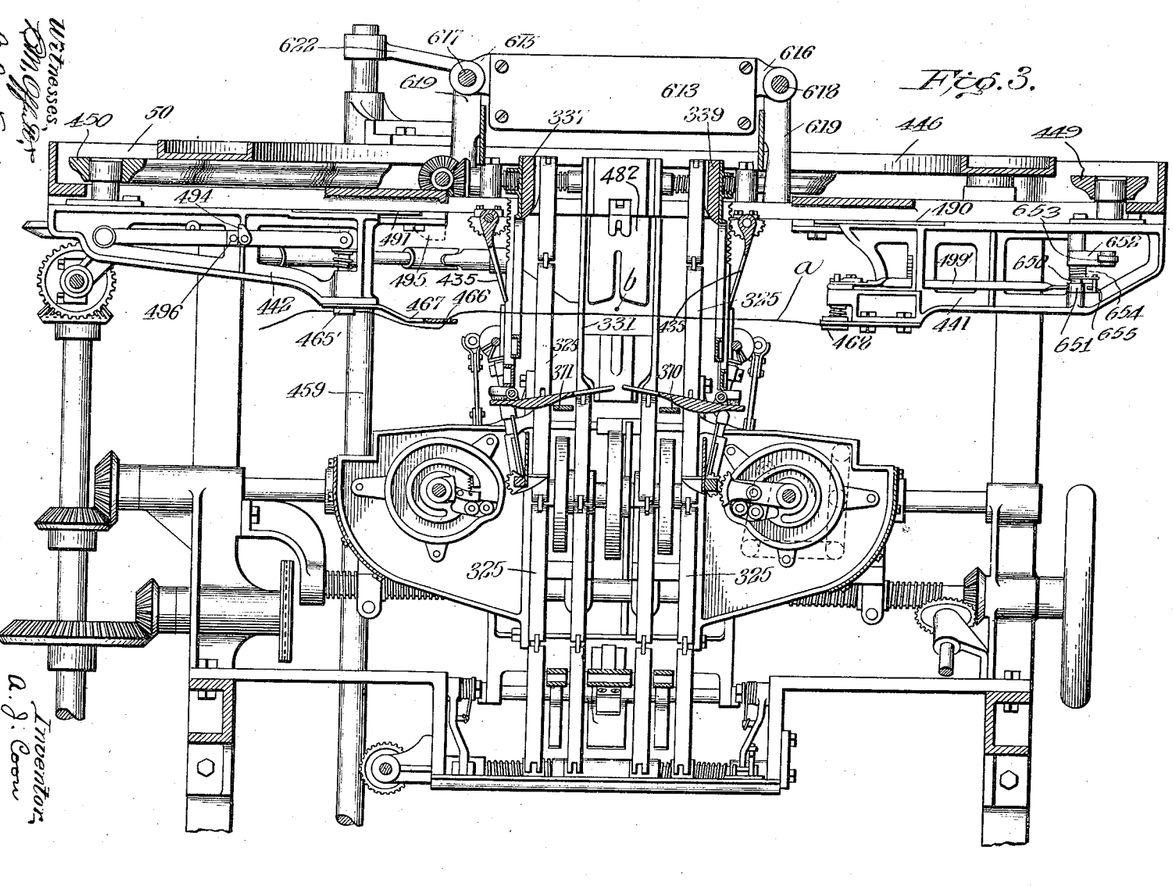
Fig. 3 is a section on the line 3—3 of Fig. 2.

The wrapper folding mechanism is shown in the lower part of Figs. 2 and 3, and since this mechanism forms no part of the invention claimed herein, a description thereof is unnecessary. The articles are moved upwardly through the folding mechanism by arms 370 and 371 which project across the vertical path of the article and are carried by the brackets 364. These brackets are given a movement of translation in a rectangular path by suitable mechanism so that the arms will move upwardly in the path of the article, to carry the article into the binding and tying mechanism, then move laterally to carry the arms from under the article, and then move downwardly and then laterally to carry the arms into the path of the article and under the next succeeding article. The article is guided in its upward movement by the laterally yieldable guides 325 and 331. The position of the article, when in position to be operated upon by the binding and tying mechanism, is such that its upper surface is substantially on a level with the underside of the top plate 50 of the machine and when the arms 370 and 371 are removed from under the article, the latter is supported by the lateral pressure of the guides.

Figure 1:
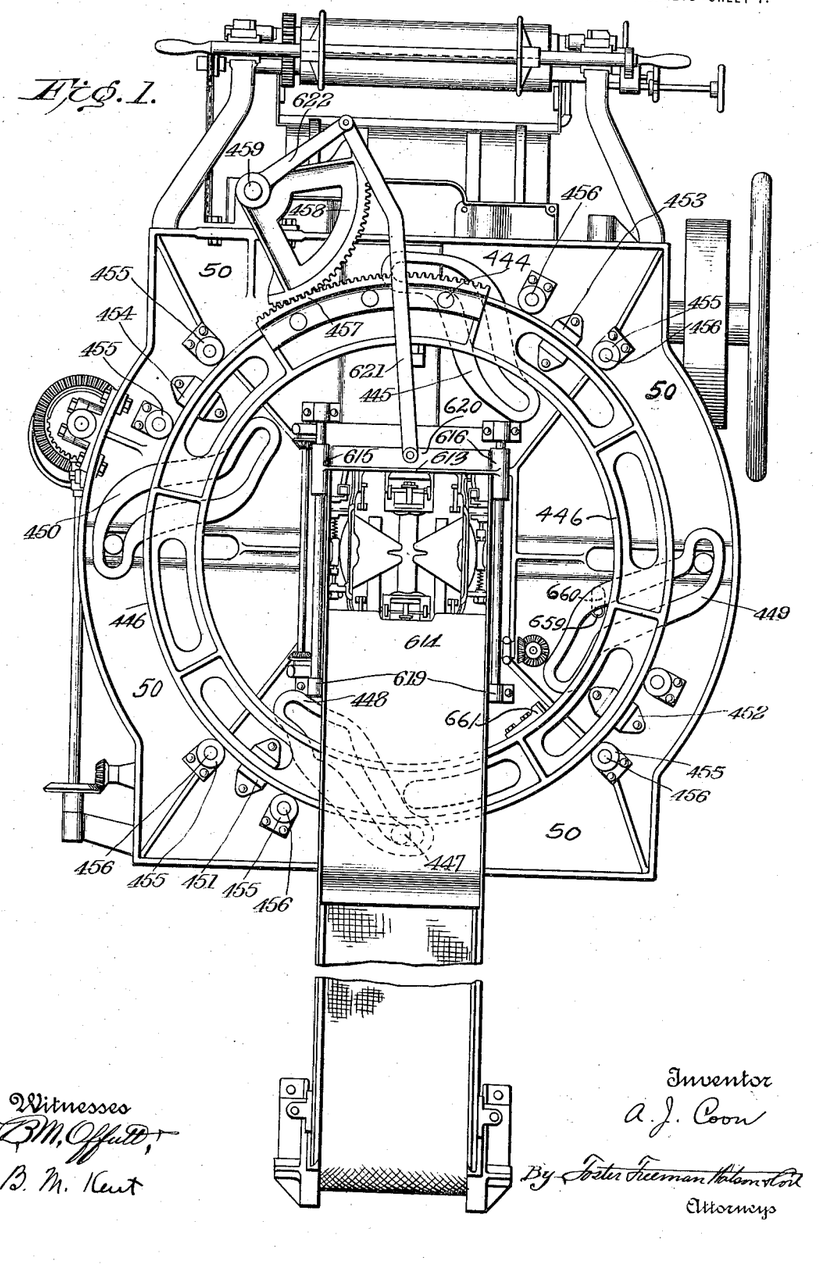
Figure 1 is a plan view of the wrapping machine forming the subject-matter of my aforesaid prior application and including a binding and tying mechanism embodying my invention.

Slidably arranged on the underside of the top 50 are frames 439, 440, 441 and 442, the frames 439 and 440 being in alinement on opposite sides of the path of the article and the frames 441 and 442 being in alinement and arranged on opposite sides of the path of the article and movable at right angles to the line of movement of the frames 439 and 440. These frames support two right angularly arranged cords or binders a and b across the path of the article so that the article will engage the cords in its upward movement from the wrapper folding mechanism. The frame 439 is provided with a pin 443 which projects through a slot in the top 50 of the frame and carries a roller 444. This roller is arranged in a slot in a cam member 445 carried by a ring 446. The frame 440 is provided with a similar roller 447 which engages a cam member 448 on the ring 446. Cam members 449 and 450 on the ring 446 are engaged by the rollers carried by the frames 441 and 442, respectively. Referring to Fig. 1 it will be seen that the ring 446 is supported at 451, 452, 453 and 454 and engaged on its periphery by rollers 455 which are supported on suitable pivots 456. The frames 439, 440, 441 and 442 are reciprocated by means of the cam members 445, 448, 449 and 450, respectively, by oscillating the ring 446 and for this purpose there is secured to the ring a gear segment 457 which meshes with a segment 458 on the vertical shaft 459, this shaft being oscillated in timed relation with the other parts of the machine.

The cord or binder a passes from the supply thereof, which is arranged at any suitable point, through a tension device 465' and from this tension device through an eye 466 of a needle 467 carried by the frame 442. From the needle the cord extends across the path of the article to a gripper 468 on the frame 441, (see Fig. 3). One of these grippers is shown in detail in Figs. 12 to 14. The gripper shown in these figures is carried by the frame 439 and consists of an arm 469 secured to the frame and having a V-shaped slot 470 in its inner end. On the lower side of the arm 469 is arranged a disk 471 having a finger 472 projecting from one side thereof and adapted to be moved across the slot 470 in either direction. A similar disk 473 is arranged on the upper side of the arm 469 and is provided with a finger 474 which is also adapted to move across the slot 470. The lower edges of the slot 470 are rounded whereas the upper edges of the slot are sharpened to coöperate with the finger 474 to form a shear for the purpose of cutting the cord. The disks 471 and 473 are arranged on a square shaft 475 which is oscillatably mounted in the arm 469 and in an extension 476 on the frame 439. The shaft 475 has a pin 477 therein and between this pin and the disk 473 is a spring 478 which is adapted to yieldably hold the disks 471 and 473 against the opposite sides of the arm 469. The end of the cord above referred to is clamped between the finger 472 and the underside of the arm 469, the spring 478 yielding sufficiently to permit this.

The cord b passes from the supply thereof through an eye in the arm 479' and a tension device 479'' and thence through an eye 480 in a needle 481 carried by the frame 440 and from this eye the cord is led across the path of the article to the gripper 472 (see Fig. 2).

As the article moves upwardly from the wrapping mechanism the cords are drawn from the supplies and are arranged across the front or top of the article and down the sides and ends thereof. When the article reaches the position between the pads 337 and 339, the frames 439, 440, 441 and 442 are moved inwardly, the plates 435 being, at the same time, swung upwardly against the rear face of the article. Plates 482, shown in Fig. 2, are also swung against the rear face of the article, the purpose of all of these plates being to protect the wrapper and prevent its being torn by the frames as the latter move across the path of the article. The plates 482 are preferably moved by positively actuated mechanism and in Fig. 2 the plate 482 on the left is shown as having connected therewith a link 482' having laterally projecting pins 482'' which engage the upper and lower sides of the bar 492 and slide on the same. The link 482' also has a downwardly projecting arm 482''' on which is coiled a spring 482'''', this spring engaging the frame 440 and yieldably swinging the plate 482 against the article as the frame moves inwardly. The bar 492 is thickened at its inner end and this thickened portion engages the pins 482'' when the frame 440 moves outwardly and thus draws the plate 482 away from the article. In order to prevent the wrapper at the lower corners of the article, adjacent the plates 482, from being pinched so that it will be cut by the cords when the latter are drawn taut, I have provided miniature folders 483 which are pivotally mounted and are swung against the corners of the article by the plates 482, these folders turning the wrapper at the corners so as to prevent its being pinched by the plates 482.

The tension devices 465' and 479'' are carried by the frames 442 and 440, respectively, and are shown in detail in Fig. 2. The cord passes through an opening 484 and is adapted to be pressed against the lower side of the opening by a plunger 485, this plunger being pressed downwardly by a spring 486 in a second plunger 487. The latter plunger is normally pressed upwardly by a spring 488, but at the proper instant is forced down to tightly hold the cord by means of a lever 489, each of the frames 440 and 442 being provided with one of these levers.

Figures 4, 5, 6, 7, 8, 19:
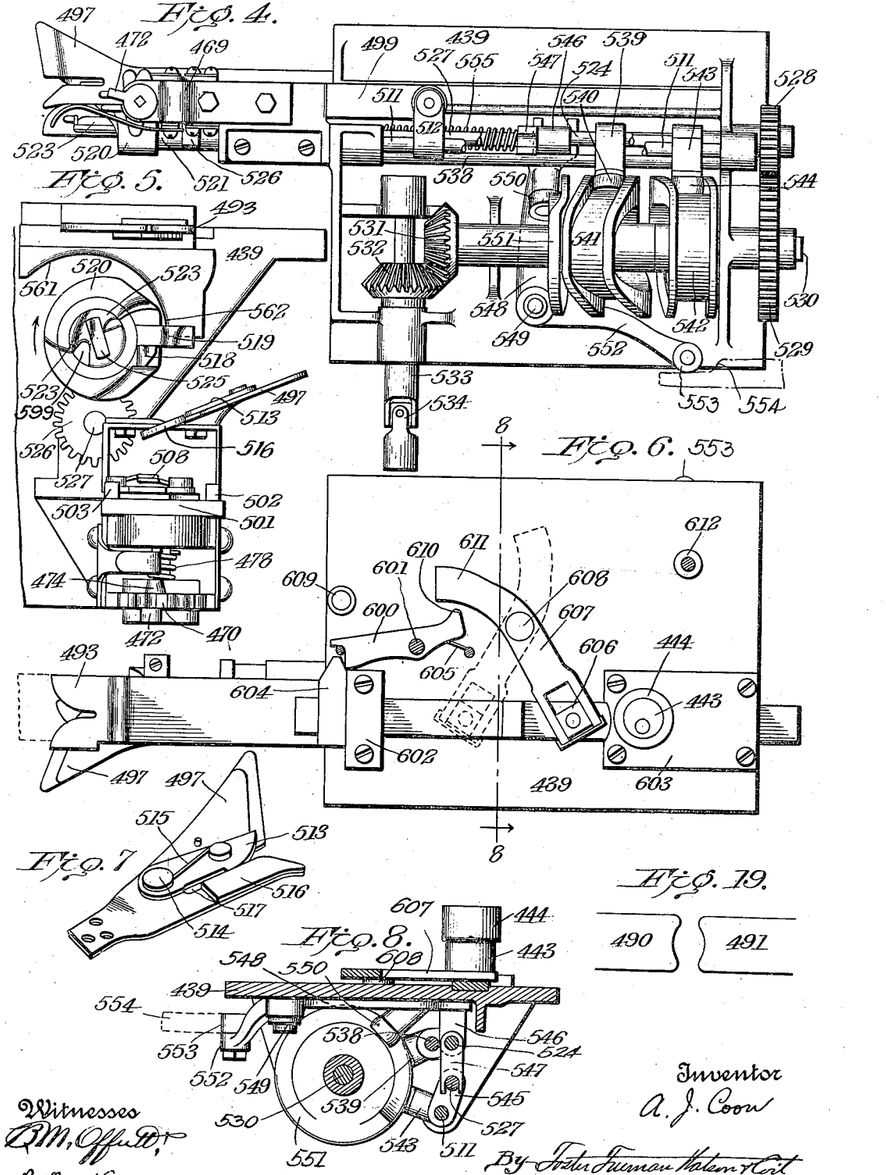
Fig. 4 is a bottom plan of the knotting mechanism.
Fig. 5 is an elevation of the inner end of the knotting mechanism.
Fig. 6 is a top plan of the knotting mechanism.
Fig. 7 is a perspective view of a detail of the knotting mechanism.
Fig. 8 is a section on the line 8—8 of Fig. 6.
Fig. 19 is a plan of details of the binding mechanism.

As shown in Fig. 3, the frames 441 and 442 carry bars 490 and 491, respectively, at their inner ends, these bars having recesses at their inner ends, as shown in Fig. 19. The opposite portions of the cord $a$ are engaged by these bars and brought to the center of the rear face of the article, the bars being substantialy in the relation shown in Fig. 19 when the frames 441 and 442 reach their innermost position. From Fig. 1 it will be seen that the shape of the cams 448, 449 and 450 is such that the frames 440, 441 and 442 will be moved to their innermost position ahead of the frame 439, which is moved by the cam 445. It will also be evident that the frame 439 will be carried a slightly greater distance than the other frame. The bar 492 is provided with a V-shaped recess in its inner end and has a function similar to that of the bars 490 and 491. The bar 492 carries one portion of the cord $b$ to the center of the article and when at its innermost position the recess in the inner end of the bar 492 will coöperate with the recesses in the bars 490 and 491 to form a substantially circular opening in which three of the cord ends are arranged. The frame 439 is provided with a bar 493 having a relatively deep V-shaped recess in its inner end, as shown in Fig. 6. The bar 493 carries the opposite portion of cord $b$ to the center of the article and, on account of moving inwardly a greater distance than the other bars, all four of the cord ends will be closely gathered in the bottom of the recess in the bar 493, the bar 492 being yieldingly held by a spring 492' (see Fig. 16) to permit the cords to be pinched by the bars.

Figure 15:
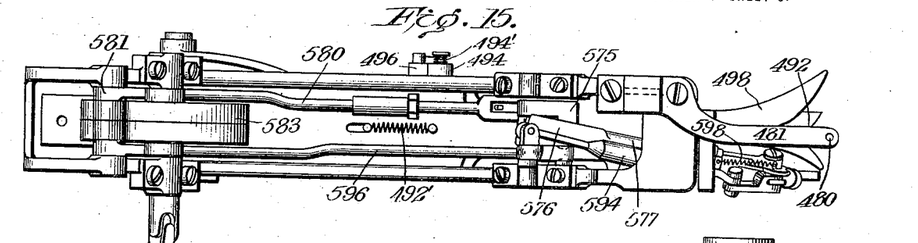
Fig. 15 is a bottom plan of the mechanism for drawing the loop against the article.

Just before the frames 440 and 442 reach the innermost position, the ends of small arms 494 on the levers 489 engage fixed abutments 495, one of which is indicated in dotted lines on Fig. 3, secured on the under side of the top 50 of the frame, and press the levers 489 downwardly to cause the tension device 465' and 479" to grip the cord and hold the same. The frames 440 and 442 move inwardly a sufficient distance to permit the arms 494 to become disengaged from the abutments 495 so as to release the cord. The effect of holding the cords for a short period is to cause them to be drawn tightly around the article and to take up whatever slack there may be in them. When the frames 440 and 442 move outwardly the arms 494 again engage the abutments 495 but the levers 489 are not depressed because the arms are turned on their pivots, suitable springs 494', shown in Fig. 15, being provided for the purpose of restoring the arms to the position shown in Figs. 2 and 3 after they have passed the abutments 495. The arms are held in the position shown in Figs. 2 and 3 by suitable stops 496 on the levers 489.

The frames 439 and 440 carry coöperating arms 497 and 498 having V-shaped recesses in their inner ends which inclose the ends of the cords when the frames are at their innermost position. After the arms 497 and 498 come together and inclose the ends of the cords the cord cutters and grippers are actuated. At this instant the needle 467 is arranged below the gripper 468 and holds the cord in the slot 470 so that when the fingers 472 and 474 are carried across the slot 470 the end which has been theretofore held by the finger 472 will be released and the cord immediately above the needle will be gripped by the finger 472, the finger 474 at the same instant severing both ends so as to cut the cords which surround the article from the supply sections.

Figure 12:
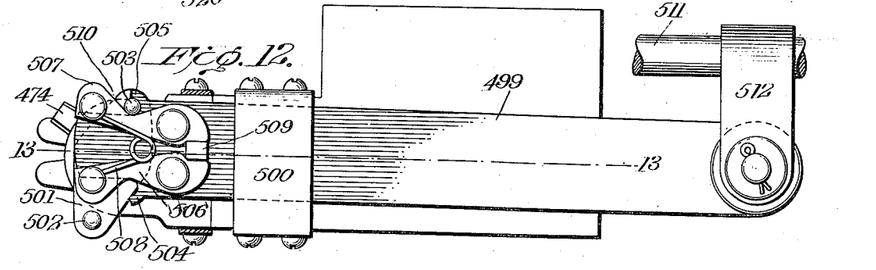
Fig. 12 is a top plan of one of the binder handling mechanisms.
Figure 13:
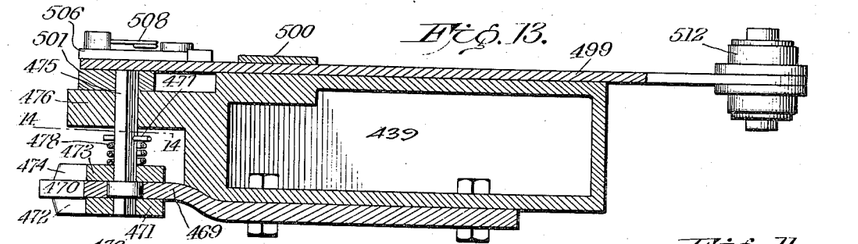
Fig. 13 is a section on the line 13—13 of Fig. 12.
Figure 14:
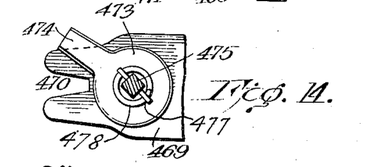
Fig. 14 is a sectional view taken on the line 14—14 of Fig. 13.

The shaft 475 is oscillated for the purpose of moving the fingers 472 and 474 to effect the cutting and gripping of the cords, by means of a slidable bar 499 which has its inner end guided by a yoke 500, the bar being movable laterally in the yoke (see Figs. 12 and 13). The upper end of the shaft 475 has secured thereon a head 501 provided with the upwardly projecting pins 502 and 503. The bar 499 is provided with shoulders 504 and 505 on opposite sides thereof, these shoulders being adapted to alternately engage the pins 502 and 503 respectively, the shoulder 505 being shown in Fig. 12 in engagement with the pin 503. With the parts in this position it will be readily understood that a movement of the bar 499 toward the left will effect a rocking movement of the shaft 475 which will carry the fingers 472 and 474 to the opposite side of the slot 470. The bar 499 has pivoted on the upper side thereof members 506 and 507, the inner ends of which are pressed apart by a spring 508 and the outer ends of which are adapted to engage a stop pin 509, as shown in Fig. 12.

When the head 501 is turned, as above described, the pin 502 is carried toward the right, in Fig. 12, and when the bar 499 is moved toward the right the engagement of the inclined surface 510, of the member 507, with the pin 503 will cause the inner end of the bar 499 to be shifted laterally so that when the bar 499 reaches the limit of its movement toward the right the shoulder 504 will be in engagement with the pin 502 and the next movement of the bar 499 toward the left will swing the fingers 472 and 474 across the slot 470 in the reverse direction, the inner end of the bar 499 being then shifted on the succeeding movement toward the right to bring the shoulder 505 again in engagement with the pin 503.

The reciprocation of the bar 499 on the frame 439 is effected by having the bar connected with a slidable rod 511 by means of an arm 512, the bar 499 being pivoted to this arm. The rod 511 is reciprocated by mechanism described hereinafter.

The cord cutting and gripping mechanism carried by the frame 441 is actuated by a bar 499' which is generally similar to the bar 499 above described. For the purpose of actuating the bar 499' there is arranged on the frame 441 a vertical shaft 650 (see Fig. 21) having an arm 651 to which the bar 499' is pivoted. The shaft 650 also carries an arm 652 having a roller 653 at its outer end. A spring 654 is coiled on the shaft 650, and has one end secured in the lower side of the arm 652 and the other end in engagement with a post 655 which is secured in the frame 441. The spring 654 is for the purpose of swinging the shaft 650 to draw the bar 499' outwardly and the movement is limited by the arm 651 engaging the post 655.

Figure 20:
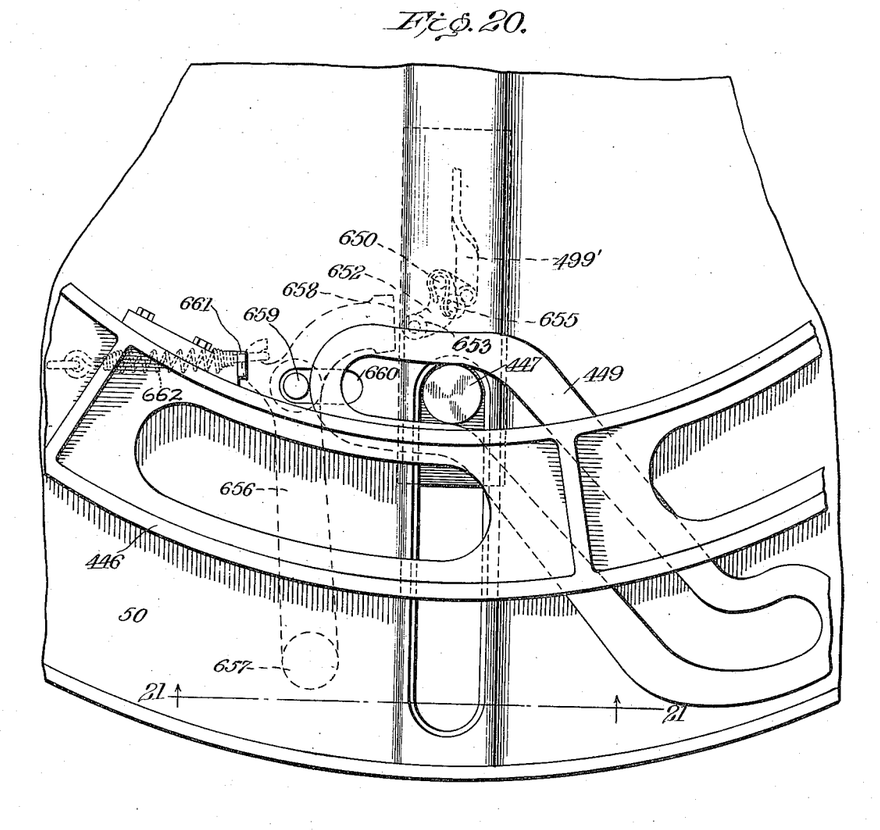
Fig. 20 is a plan view of a portion of the top of the machine on an enlarged scale.
Figure 21:
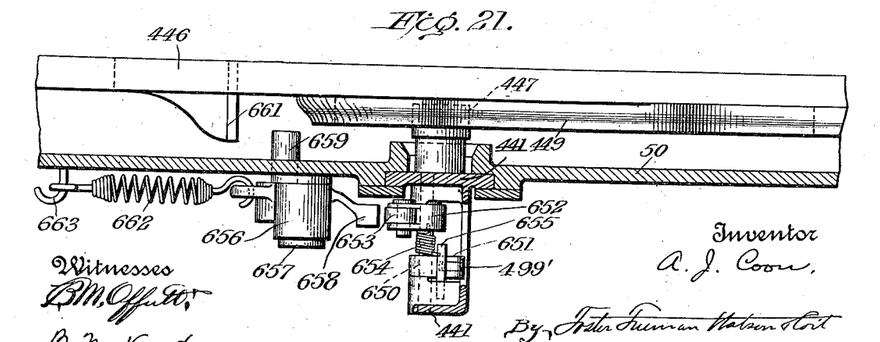
Fig. 21 is a section on the line 21—21 of Fig. 20.

The shaft 650 is turned in opposition to the spring 654 by means of a lever 656 which is pivoted at 657 to the top 50 of the frame. The lever 656 has its free end 658 arranged to engage the roller 653 when the frame 441 is at its innermost position and from Fig. 20 it will be seen that a movement of the lever 656 toward the right will rock the shaft 650 to move the bar 499' inwardly, and thus actuate the cord cutting and gripping mechanism. In order to actuate the lever 656 at the proper time the lever is provided with an up-standing post 659 which projects through a slot 660 (Fig. 1) in the top 50 and this post is engaged by a bracket 661 on the ring 446 just before the ring reaches the end of its movement toward the right in Fig. 20. From this figure it will be seen that the cam 449 will have moved the frame 441 to its innermost position before the post 659 is engaged by the bracket 661 and therefore the lever 656 will not be actuated until the roller 653 is in position alongside of the end 658 of the lever. Upon the return movement of the ring 446 the lever 656 is returned by means of the spring 662 which has one end connected with the lever 656 and the other end with a fixed hook 663 on the top 50 (Fig. 21.).

After the cords have been severed from the supply sections they are held at the center of the rear face of the article by the bars 492 and 493 and by the arms 497 and 498, the latter holding the free ends of the cords. The cords are now in position to be seized by the knot forming mechanism which is carried by the frame 439. Referring to Fig. 7, it will be seen that the arm 497 has a member 513 pivoted thereto at 514, a spring 515 being provided for the purpose of holding the member 513 against the abutment 516 which is secured to the arm 497. The purpose of the member 513 is to secure the cords against accidental displacement out of reach of the knot forming mechanism. As the cord enters the slot in the arm 497 the member 513 is swung away from the abutment 516 to permit the cord to enter the recessed portion 517 in which it remains until withdrawn by the knot forming mechanism.

Figure 9:
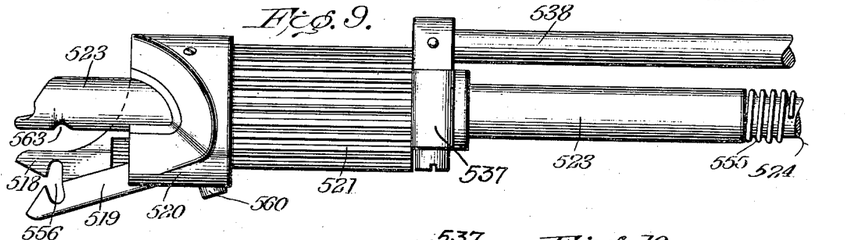
Fig. 9 is an enlarged elevation of a portion of the knotting mechanism.
Figure 10:
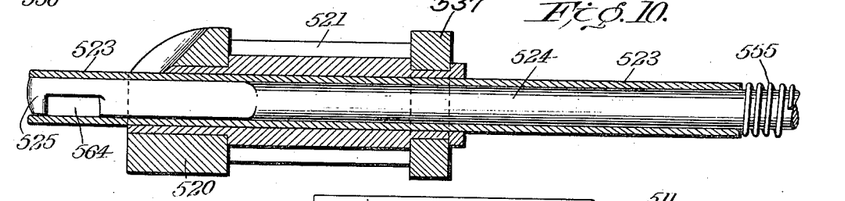
Fig. 10 is a central longitudinal section through Fig. 9.

Referring to Fig. 5, it will be observed that the cords, being held in the V-shaped recesses in the bar 493 and the arm 497, will be in position to enter between the open jaws 518 and 519 carried by the revolving head 520 when the latter is moved inwardly (see also Fig. 9). The head 520 has secured thereto a gear 521 and is rotatably mounted on a tube 523. The tube 523 is supported in the frame 439 and carries on its interior a slidable rod 524 having a hook 525 at its inner end. The gear 521 has in mesh therewith a pinion 526 (see Fig. 2), which is mounted on a shaft 527, this shaft having on its opposite end a gear wheel 528 which is rotated by a gear 529 on a shaft 530. The shaft 530 also carries a bevel gear 531 which meshes with a gear 532 on a shaft 533. The shaft 533 is driven in any suitable manner to operate the tying mechanism in synchronism with the machine with which it is associated.

The gear wheel 521 has secured thereto a collar 537 to which is attached a rod 538, (Fig. 9.) The rod 538 carries an arm 539 having a cam roller 540 (Fig. 4) thereon which engages a cam 541 on the shaft 530, this cam sliding the rod 538 together with the gear 521 and head 520 axially on the tube 523. The arm 539 is extended to slide on the rod 534, this shaft serving as a guide for the arm and preventing it being turned about the rod 538 by the cam 541. The rod 511 is moved axially by a cam 542 on the shaft 530, the rod having secured thereon an arm 543 having a cam roller 544 which engages the cam 542. The arm 543 has an extension 545 (Fig. 8) which engages the shaft 527 and slides thereon, the arm 543 being thereby prevented from being turned by the cam 542.

The rod 524 has secured thereto an arm 546 (Fig. 4) which is provided with an extension 547 (Fig. 8) engaging the shaft 527 whereby the arm is prevented from turning. The arm 546 is engaged by a lever 548 (Fig. 4) which is pivoted on the frame 439 at 549 and carries a cam roller 550 which engages a cam 551 on the shaft 530. The lever 548 has an arm 552 which carries a cam roller 553 adapted to engage a fixed cam 554 on the top 50 of the frame (see Figs. 4 and 8). A spring 555 surrounds the rod 524 (Fig. 4) and has one end in engagement with the tube 523 (Fig. 9) and its other end in engagement with the extension 547 so that when the rod 524 is moved toward the left in Fig. 4 the spring 555 will be compressed and will move the rod toward the right when the lever 548 is released by the cams 551 and 554.

Figure 11:
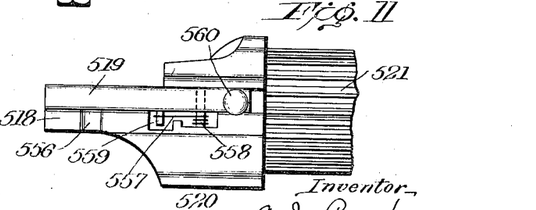
Fig. 11 is a fragmentary elevation of the left hand portion of Fig. 9.

In the operation of the knot forming mechanism the cam 541 moves the head 520 inwardly on the tube 523 until the cords, which are held in the arms 493 and 497, as above described, are opposite the recesses 556 (Fig. 9) in the grippers 518 and 519. At this instant the grippers automatically close on the cords and as the grippers rotate with the head 520 they carry the ends of the cords around the inner end of the tube 523. The grippers are closed by means of a spring 557, shown in Fig. 11. The gripper 519 is pivoted on the head 520 and the spring 557 which is coiled on the pin 558 has one of its ends in engagement with a pin 559 on the gripper 519 and tends to close the latter. The gripper 519 carries on its side a pin 560 which engages a cam surface 561 on the frame 439 (see Fig. 5), to effect an opening movement of the gripper 519 as the head 520 is rotated. When the cords are opposite the recesses 556 in the grippers the pin 560 passes off the end 562 (Fig. 5) of the cam 561 and the spring 557 closes the gripper 519. The grippers, rotating in the direction of the arrow, Fig. 5, carry the ends of the cord around the tube 523, the cord being laid in the groove 563. As the grippers make the first revolution around the tube 523 the head 520 is drawn rearwardly to permit the inner ends of the grippers to pass the portion of the cords which extends from the tube 523 upwardly to the article. Immediately after the grippers have passed this point they are suddenly moved inwardly to cross the free ends of the cord over the loop which has been formed on the tube 523 and to lay the ends across the end of the tube 523 and in the recess 564 in the end of the rod 524, this rod having in the meantime been moved inwardly to carry the recess 564 out of the tube. As soon as the ends of the cord are laid in the recess 564 the rod 524 is permitted to spring back into the tube so that the hook 525 will grip the cord ends and securely hold them. After this has been accomplished the mechanism carried by the frame 440 is brought into play to slip the loop off the tube 523 and carry it upwardly to the article.

Referring to Figs. 15 to 18 it will be seen that the frame 440 carries a shaft 565 which is driven in any suitable manner to operate in synchronism with the other parts of the tying mechanism just described. The frame 440 also carries a shaft 573 on which is arranged an arm 574 having a lateral extension 575 on its hub which is arranged in the forked end 576 of an arm 577 which is pivoted on a block 578 so as to have universal movement with respect to the shaft 573. Between the extension 575 and the opposite arm of the forked end 576 is a comparatively stiff spring 579. This connection between the arm 574 and the arm 577 enables the latter to be moved by the former and at the same time have universal movement with respect thereto and permits the arm 574 to be moved after the arm 577 reaches the limit of its upward movement, on account of the spring 579 yielding.

The arm 574 is rocked by means of a rod 580 which has its rearward end connected with the upper end of a lever 581, the lower end of this lever being arranged on a pivot 582 carried by the frame 440. The lever 581 carries a cam roller which is arranged in a cam groove on one side of the cam wheel 583, the arrangement being similar to that shown in Fig. 16 for operating the lever 584.

The inner end of the arm 577 carries a roller 585 which is arranged in a cam groove 586 in the inner face of the frame 440. From Fig. 17 it will be evident that as the arm 577 moves upwardly from the position shown it will also be carried sidewise or laterally to a certain extent, this lateral movement being for a purpose to be described hereinafter.

Figure 16:
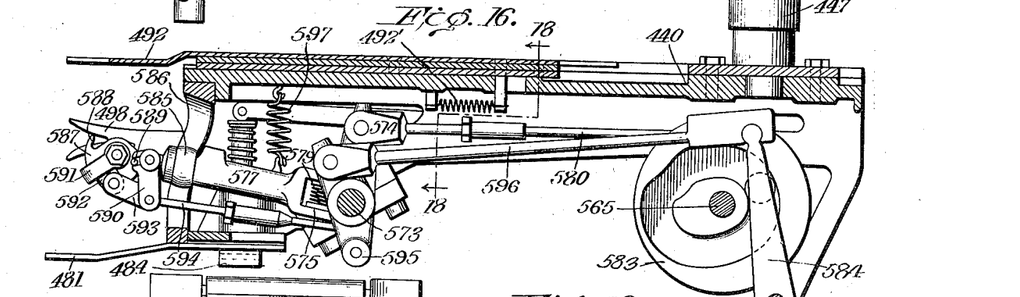
Fig. 16 is a longitudinal section through Fig. 15.
Figure 17:
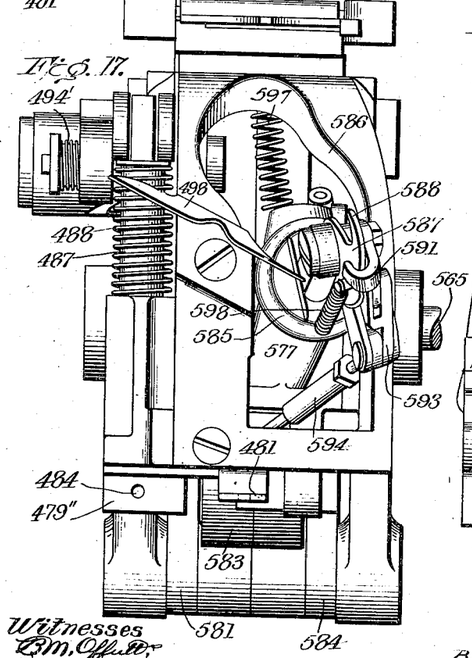
Fig. 17 is an enlarged elevation of the mechanism at the left hand end of Fig. 16.
Figure 18:
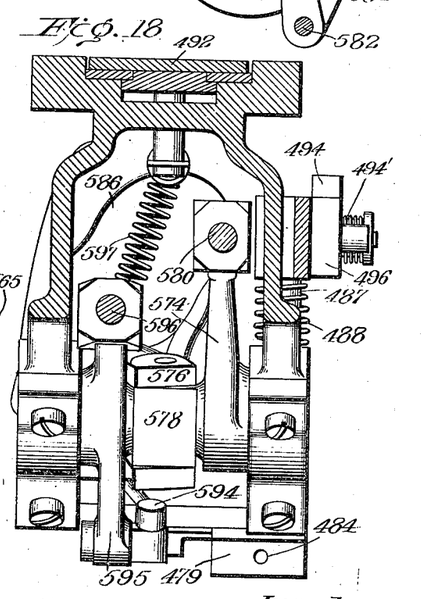
Fig. 18 is a transverse section on the line 18—18 of Fig. 16.

Pivoted to the inner end of the arm 577 is a disk 587 having thereon an upwardly pointed hook 588. The disk 587 carries a pin 589 which is engaged by a lever 590, this lever also being pivoted to the arm 577, as shown in Fig. 16. Arranged on the pivot of the disk 587 and movable independently of the disk is a hook shaped arm 591, the hook of which embraces the edge of the disk 587, as shown in Fig. 17. The arm 591 has an extension 592 to which is pivoted a link 593, this link and the lever 590 having a common pivotal connection with a rod 594.

From Fig. 16 it will be seen that when the rod 594 is moved toward the left the arm 591 will be swung upwardly toward the hook 588 and, on account of the pin 589 being engaged by the lever 590, the disk 587 will be swung in the opposite direction to carry the hook 588 toward the arm 591. For the purpose of moving the rod 594 it is connected with one arm of a lever 595, this lever being pivoted on the shaft 573. The upper arm of the lever 595 has pivoted thereto a rod 596, this rod being connected with and actuated by the lever 584.

As shown in Fig. 16 a spring 597 connected with the arm 577 and with the frame 440 is adapted to assist in raising this arm. A spring 598 (Fig. 17) is connected with the disk 587 and with the arm 577 and tends to swing the disk in the direction to carry the hook 588 downwardly.

The manner in which the loop is drawn from the tube 523 will now be described. Referring to Fig. 5 it will be seen that the tube 523 has a longitudinal groove 599 in the under side thereof. After the ends of the cords have been gripped by the hook 525, in the manner described hereinabove, the mechanism carried by the frame 440 is actuated to carry the arm 577 upwardly, the hook 588 engaging the groove 599 at a point in the rear of the loop which has been laid on the tube 523. The frames 439 and 440 are then moved outwardly in succession and the hook 588 engages the loop in the cords and draws the same off the end of the tube 523. The ends of the cords being held by the hook 525 and the lever 577 continuing in its upward movement as the frame 440 is withdrawn, it will be seen that the loop will be carried upwardly to the rear face of the article. In order to hold the cords at the center of the article as the frame 439 is withdrawn the bar 493 is maintained at its innermost position by means of a latch 600 which is arranged on a pivot 601 carried by the top 50 (see Fig. 6). The bar 493 is slidably mounted on the frame 439, being arranged in guides 602 and 603 on the frame. The bar 493 has a lateral extension 604, the end of which is engaged by the latch member 600, the latch member being held against the extension 604 by a spring 605 carried by the top 50. The bar 493 has pivoted thereto a block 606 which has a sliding connection with a lever 607 pivoted on the top of the frame 439 at 608.

As the frame 439 moves outwardly the pivot 608 will, of course, be carried with it and the lever 607 will be swung into the position shown in dotted lines.

From Fig. 5 it will be observed that the tube 523 is arranged slightly to one side of the center of the path of the article, the V-shaped recess in the bar 493 being substantially on this center line. Therefore, in order to bring the loop to the center of the article it is necessary to give the hook 588 a lateral movement and this is accomplished by the cam groove 586. When the hook 588 has moved upwardly to the bar 493 the frame 439 will have moved outwardly a sufficient distance to draw the ends of the cords taut. At this instant the rod 594 is actuated to move the hook 588 downwardly and the arm 591 upwardly, thus stripping the loop from the hook and permitting the knot to be drawn tight. Immediately after this occurs the rod 524 is moved inwardly to permit the hook 525 to release the ends of the cord.

At about the instant that the cords are released by the hook 525 a roller 609 carried on the top of the frame 439 strikes the toe 610 of the latch member 600 and throws the latch member out of engagement with the extension 604. At this same instant the end 611 of the lever 607 strikes a roller 612 carried by the top 50 and swings from the dotted position shown in Fig. 6, to the position in full lines, as the frame 439 continues its outward movement. This swinging of the lever 607 withdraws the bar 493.

The driving mechanism for the shaft 530 is so arranged that the shaft is not rotated while the frame 439 is being withdrawn and it is therefore necessary to provide means for actuating the lever 548 independently of the cam 551, for the purpose of releasing the ends of the cord which are held by hook 525. This means consists of the cam 554 which is carried by the top 50, this cam being engaged by the roller 553 as the frame 439 is moved outwardly and shifting the lever 548 to permit the hook 525 to release the cords.

The frames 439, 440, 441 and 442, being withdrawn to their outermost position, the parts are in the position to apply the binders to the next succeeding article. As hereinabove described, the cord grippers 468 and 472 grip the supply sections at the same instant that the portions which are around the article are severed from the supply sections and therefore when the frames are moved outwardly the grippers will still retain the ends of the cords and when the frames reach their outermost position there will be two right-angularly arranged cords across the path of the article which will be engaged by the succeeding article in its upward movement and the operation of binding and tying will be repeated.

The succeeding article will strike the underside of the article which has just been tied and force the same upwardly. This article will then be engaged by the horizontally movable plate 613 and carried to the bottom plate 614 of the delivery chute. The plate 613 is carried at its opposite ends by the slides 615 and 616 which are movable on the rods 617 and 618, respectively, these rods being supported at their ends by brackets 619 on the top 50. The plate 613 has secured thereto a bracket 620 to which is pivoted one end of a link 621, (Figs. 1 and 2) the opposite end of this link being connected with an arm 622 on the upper end of the shaft 459, the oscillation of this shaft effecting the movement of the plate 613. The plate 613 is moved a sufficient distance to carry the article out of the way of the next succeeding article and when the latter has been elevated it will be moved against the first article and shove the latter forwardly in the delivery chute. Any preferred means may be provided for handling the articles from the delivery chute and as such means forms no part of the present invention the same has been omitted from this application.

The invention, as will be obvious, is adapted to bind and tie an article or group of articles having a wrapper thereon, or to bind and tie a group of unwrapped articles together or to bind and tie a box package and while I have illustrated the invention in connection with a machine for wrapping articles, such as loaves of bread, I do not wish to be limited to such use, and where I have used the term "article" in the claims I intend to refer to a single article or a group of articles which are handled as a unit.

Having described my invention what I claim and desire to secure by Letters-Patent is, 1. In a machine of the class described, the combination of means adapted to intermittently translate an article in a rectilinear path, means for holding a plurality of binders in intersecting planes in the path of the article, means for bringing the ends of the binders together in the rear of the article, and means for tying said ends contiguous to the rear face of the article.

2. In a machine of the class described, the combination of means adapted to intermittently translate an article in a rectilinear path, means for holding two right angularly arranged binders in the path of the article, means for bringing the ends of the binders together in the rear of the article, and means for tying all of said ends in a single knot.

3. In a machine of the class described, the combination of means adapted to intermittently translate an article in a rectilinear path, means adapted to arrange a binder around a plurality of the faces of the article while the latter is in motion, and means adapted to bring the ends of the binder together in the rear of the article while stationary.

4. In a machine of the class described, the combination of means adapted to intermittently translate an article, means adapted to arrange two right angularly arranged binders around certain faces of the article while in motion, means adapted to bring the ends of the binders together in the rear of the article, and means for tying all of the ends in a single knot.

5. In a machine of the class described, the combination of means for translating an article in a substantially straight path, means for holding two right angularly arranged binders in the path of the article, means adapted to move transversely of said path for bringing the ends of the binders together in a group at the rear of the article, and means for securing said ends together.

6. In a machine of the class described, the combination of means for translating an article in a substantially straight path, means for holding two right angularly arranged binders in the path of the article, means adapted to move transversely of said path for bringing the ends of the binders together in a group at the rear of the article, means adapted to grasp the ends of the binders and form a loop therein at a point removed from the article, and means for sliding the loop against one of the faces of the article.

7. The combination of means for moving an article in a substantially straight path, means for arranging a binder around an article, means arranged to move toward the article from opposite sides thereof to bring the ends of the binder together in the rear of the article, means forming the ends of the binder in a loop, and means for drawing the loop against the article.

8. The combination of means for arranging a binder around an article, means arranged to move toward the article from opposite sides thereof to bring the ends of the binder together, means for forming the ends of the binder in a loop, and means for drawing the loop against the article.

9. The combination of means for arranging a plurality of binders around an article, means arranged to move toward the article to bring the ends of the binders together, means for forming the ends of the binders in a loop, and means for drawing the loop against the article.

10. The combination of means for arranging two binders around an article at right angles to each other, means arranged to move from the sides toward the center of one face of the article to bring the ends of the binders together, means for forming the ends of the binders in a loop, and means for drawing the loop against the article.

11. The combination of means for arranging two binders around an article at right angles to each other, separate means adapted to bring each of the ends of the binders to a position adjacent one of the faces of the article, and means adapted to grasp all of said ends simultaneously and tie the same together.

12. The combination of means for moving an article in a definite path, means for arranging a binder around the article, means for grouping the ends of the binder together at the rear of the article and for forming a loop therein, and means arranged to move toward the article from the rear thereof and draw said loop against the article.

13. The combination of means for moving an article along a definite path, means at the side of the path for securely holding the ends of a plurality of cords arranged in intersecting planes, oppositely arranged means for loosely holding the cords with portions thereof extending across said path, means for moving the latter cord holding means across said path, and means associated with said first-mentioned cord-holding means for simultaneously severing a section from each cord, releasing the severed sections and gripping the supply sections of the cords.

14. The combination of means for moving an article along a definite path, means on two sides of the path for securely holding the ends of two cords, means oppositely arranged with respect to said first mentioned holding means for loosely holding said cords with portions thereof extending at right angles to each other across said path, means for moving the latter cord-holding means across said path, and means for severing sections from said cords, releasing the severed sections so that they may be carried along with the article, and gripping the ends of the supply section of the cords.

15. The combination of means for moving an article with the wrapper thereon along a definite path, means on two sides of the path for securely holding the ends of two cords, means oppositely arranged with respect to said first mentioned holding means for loosely holding said cords with portions thereof extending at right angles to each other across said path, means for moving the latter cord-holding means across said path, and means associated with said first-mentioned cord-holding means for simultaneously severing sections from said cords, releasing the severed sections, and gripping the ends of the supply sections of the cords.

16. The combination of means for moving an article along a definite path, means on two sides of the path for securely holding the ends of two cords, means oppositely arranged with respect to said first mentioned holding means for loosely holding said cords with portions thereof extending at right angles to each other across said path, means for moving the latter cord-holding means across said path, means for severing sections from said cords, releasing the severed sections so that they may be carried along the article, and gripping the ends of the supply sections of the cords, and means for retracting said latter cord-holding means to position the cords across said path.

17. The combination of means for moving an article along a definite path, means on two sides of the path for securely holding the ends of two cords, means oppositely arranged with respect to said first mentioned holding means for loosely holding said cords with portions thereof extending at right angles to each other across said path, means for moving the latter cord-holding means across said path, means associated with said first-mentioned cord-holding means for simultaneously severing sections from said cords, releasing the several sections, and gripping the ends of the supply sections of the cords, and means for retracting said latter cord-holding means to position the cords across said path.

18. The combination of means for moving an article along a definite path, means at one side of said path for securely holding the end of a binder, means on the opposite side of said path for loosely holding the binder with a portion thereof extending across said path so as to be engaged by the article moving therealong, means for moving one of said binder-holding means across said path in the rear of the article so that the latter is encircled by the binder, means for severing the section of the binder, encircling the article, from the supply section, means for releasing the severed section from said holding means, and for gripping the end of the supply section, means for securing the ends of the severed section together, and means for retracting said binder-holding means to position the binder across said path.

19. The combination of means for moving an article along a definite path, means at one side of said path for securely holding the end of a binder, means on the opposite side of said path for loosely holding the binder with a portion thereof extending across said path so as to be engaged by the article moving therealong, means for moving said second-mentioned binder-holding means across said path in the rear of the article so that the latter is encircled by the binder, means for severing the section of the binder, encircling the article, from the supply section, means for releasing said severed section from said holding means and for gripping the end of the supply section, means for tying the ends of the severed section of the binder together, and means for retracting said second mentioned binder-holding means to position the binder across said path.

20. The combination of means for moving an article along a definite path, means situated on adjacent sides of said path for securely holding the ends of two right angularly disposed binders, coöperating means opposite said holding means for loosely holding portions of said binders across said path, so as to be engaged by the article moving therealong, means for moving said second-mentioned binder-holding means across said path in the rear of the article so that the latter is encircled by the binders, means for severing the sections of the binders, encircling the article, from the supply sections, means for releasing the severed sections from said holding means and for gripping the ends of the supply sections, means for tying the ends of the severed sections together, and means for retracting said binder-holding means to position the binders across said path.

21. In a machine of the class described, the combination of means for feeding articles, means for feeding a plurality of continuous pieces of binding material to a position to be applied to the articles, means for severing a plurality of binders for each article and for arranging the same around the articles, and means for tying the ends of all of the binders together into a single knot.

22. In a machine of the class described, the combination of means for feeding articles, means for feeding two continuous pieces of binding material to a position to be applied to the articles, means for severing a binder from each piece for each article and for arranging the same around the articles at right angles to each other, and means for grouping and tying the ends of the binders together.

23. In an apparatus of the class described, means for moving an article, devices arranged on opposite sides of the path of the article for holding a binder across said path, one of said devices including means for periodically resisting movement of the binder and a member having an opening therein through which the binder loosely passes and the other of said means being adapted to firmly grip the end of the binder.

24. In an apparatus of the class described, the combination of means for moving an article, means on one side of the path of the article for holding a binder, means on the opposite side of the path for holding the end of the binder and for severing a section thereof, said last-mentioned means comprising a member arranged transversely of the path of the article and having a recess and devices arranged on opposite sides of said member and having portions adapted to be moved across said recess, one of said devices coöperating with said member to sever the binder and the other of said devices coöperating with the said member to grip the end of the binder.

25. In an apparatus of the class described, the combination of means for moving an article, means arranged on one side of the path of the article for holding a binder, means on the opposite side of the path for holding the end of the binder and for severing a section thereof, said means comprising a member having a recess in the side adjacent the path of the article and devices arranged on the opposite sides of said member and having portions adapted to be moved across said recess, one of said devices coöperating with said member to sever the binder and the other of said devices coöperating with said member to grip the binder.

26. In an apparatus of the class described, the combination of means for moving an article, means on one side of the path of the article for holding a binder, means on the opposite side of said path arranged to be moved into the path of the article for holding the end of the binder and severing a section thereof, said last-mentioned means comprising a member having a recess in its side adjacent the path of the article and said first-mentioned holding means being arranged to move across the path of the article and hold the binder in said recess.

27. In an apparatus of the class described, the combination of means for moving an article, means on one side of the path of the article for holding a binder, means on the opposite side of the path for holding the end of the binder and severing a section thereof, said last-mentioned means comprising a member having a recess or notch in the side thereof adjacent the path of the article and oscillating devices arranged on the opposite sides of said member, one of said devices being provided with an extension adapted to be moved across said recess to grip the binder and the other of said devices being adapted to move across said recess to sever the binder.

28. In an apparatus of the class described, means for arranging a binder around an article, said means comprising a member having a recess or notch and devices arranged on the opposite sides of said member and provided with extensions adapted to be moved across said recess simultaneously.

29. In an apparatus of the class described, means for arranging a binder around an article and means for holding the end of the binder and severing a section thereof, said last-mentioned means comprising a member having a recess or notch on one side thereof, devices arranged on opposite sides of said member and having extensions adapted to be moved across said recess, the extension on one of said devices coöperating with the edge of said recess to form a cutter and the extension on the other of said devices coöperating with the edge of said member to grip the end of the binder.

30. In an apparatus of the class described, means for arranging a binder around an article, and means for holding the end of the binder and severing a section thereof, said last-mentioned means comprising a member having a V-shaped recess in one side thereof and devices arranged on opposite sides of said member having extensions adapted to be moved across said recess, the sides of the extension on one of said devices coöperating with the edges of said recess to form a cutter and the sides of the extension on the other of said devices coöperating with the edges of said recess to grip the end of the binder.

31. In an apparatus of the class described, means for moving an article, means arranged on one side of the path of the article for holding a binder and severing a section thereof, said last-mentioned means comprising a member having a recess in one side thereof, a shaft extending through said member, devices fixed on said shaft and arranged on opposite sides of said member and adapted to coöperate with said recess to sever the binder and grip the end thereof and means for oscillating said shaft to move said devices across said recess.

32. In an apparatus of the class described, means for holding the end of a binder and severing a section thereof and comprising a member having a recess in one side thereof, a shaft extending through said member and provided with devices arranged on opposite sides of said member and adapted to coöperate with the edges of said recess to sever the binder and grip the end thereof, and reciprocating means adapted to oscillate said shaft.

33. In an apparatus of the class described, means for holding the end of a binder and severing a section thereof and comprising a member having a recess in one side thereof, a shaft extending through said member, devices arranged on opposite sides of said member and having extensions adapted to be moved across said recess, a member arranged on one end of said shaft and having spaced projections thereon and a plate arranged on one side of said member and having abutments adapted to alternately engage said projections as said plate is reciprocated.

34. In an apparatus of the class described, means for holding the end of a binder and severing a section thereof and comprising a member having a V-shaped recess in one side thereof, a shaft extending through said member, means carried by said shaft and arranged on opposite sides of said member and having projections adapted to be oscillated from one side of said recess to the other and simultaneously grip the end of the binder and sever a section thereof when moving in either direction, a member secured to one end of said shaft and having projections thereon and a reciprocating plate having abutments adapted to alternately engage said projections to oscillate said shaft.

35. In an apparatus of the class described, the combination of means adapted to simultaneously grip the end of a binder and sever a section thereof, and means for oscillating said shaft and comprising a member secured to the end of said shaft and having spaced projections thereon, a reciprocating plate having a portion extending between said projections and provided with abutments adapted to alternately engage said projections, and means pivotally mounted on said plate and adapted to alternately move the latter sidewise so that said abutments will alternately engage said projections.

36. In an apparatus of the class described, means for moving an article, a member arranged at one side of the path of the article and arranged to be moved into said path, means on the side of said member facing in the direction of movement of the article for severing a binder, and means on the opposite side of said member adapted to grip the end of the binder.

37. In an apparatus of the class described, means for moving an article in a vertical path, a horizontally arranged member one side of the path of the article, means on the lower side of said member adapted to coöperate therewith to grip the end of a binder, and means on the upper side of said member and adapted to coöperate therewith to sever the binder.

38. In an apparatus of the class described, means for arranging the binder around an article, means for grouping the ends of the binder together opposite the central portion of one of the faces of the article, means movable in a path parallel to said face adapted to seize the ends of the binder and form the same in a loop, and means for drawing said loop into a knot.

39. In an apparatus of the class described, means for arranging a binder around an article, means for grouping the ends of the binder together opposite the central portion of one of the faces of the article, means movable in a path parallel to said face adapted to seize the ends of the binder and also move in a circular path to form a loop in said ends, and means independent of said first mentioned means for drawing said loop into a knot.

40. In an apparatus of the class described, means for arranging a binder around an article, means for grouping the ends of the binder together opposite the central portion of one of the faces of the article, a member parallel and spaced from said face, means adapted to seize the ends of the binder and carry said ends around said member to form a loop thereon, and means for drawing said loop off the end of said member to form a knot.

41. In an apparatus of the class described, means for arranging a binder around an article, means for grouping the ends of the binder together opposite the central portion of one of the faces of the article, a tubular member spaced from the article and arranged to be moved to and from a position opposite said face, means spaced from said tubular member and adapted to seize the ends of the binder and pass the same around said tubular member to form a loop thereon, and means independent of said tubular member for drawing said loop off the end of said tubular member to form a knot.

42. In an apparatus of the class described, means for arranging a binder around an article, means for grouping the ends of the binder together opposite the central portion of one of the faces of the article, a tubular member spaced from the article and arranged to be moved to and from a position opposite said face, a gripper spaced from said tubular member and adapted to seize the ends of the binder and pass the same around said tubular member to form a loop thereon and to cross the ends over said loop, means at the end of said tubular member for gripping the ends of said binder, and means independent of said member adapted to draw the loop off the end of said tubular member to form a knot.

43. In an apparatus of the class described, means for arranging a binder around an article, a plurality of spaced devices adapted to group the ends of said binder together adjacent the central portion of one of the faces of the article, a tubular member arranged between said devices and adjacent the ends of the binder, means movable transversely of and into the path of the article to a position opposite said face adapted to seize the ends of the binder and pass the same around said tubular member to form a loop thereon and then cross the ends of the binder over said loop, means coöperating with said tubular member to seize said ends, and means for drawing said loop off the end of said tubular member to form a knot.

44. In an apparatus of the class described, means for arranging a binder around an article, a plurality of pairs of coöperating devices adapted to group the ends of the binder together, a tubular member arranged between said devices and adjacent the ends of the binder, a gripper movable longitudinally of said tubular member and adapted to seize the ends of the binder and pass the same around said tubular member to form a loop thereon and then cross the ends over said loop and the end of said tubular member, a gripping member arranged within said tubular member and having means coöperating with the end of the latter to grip the ends of the binder, and means for drawing the loop off the end of said tubular member while the ends of the binder are held by the gripping member to form a knot.

45. In an apparatus of the class described, means for arranging a binder around an article, means adapted to group the ends of the binder together opposite the central portion of one of the faces of the article, a tubular member movable transversely of the path of the article to a position opposite said face, a member slidably and rotatably mounted on said tubular member and having means adapted to seize the ends of the binder, means for rotating said last-mentioned member to form the ends of the binder in a loop on said tubular member, means for moving said member longitudinally of the tubular member to cross the ends of the binder over the loop and the end of the tubular member, a member arranged within said tubular member and provided with means adjacent the end of the tubular member adapted to coöperate therewith to form a gripper for the ends of the binder, and means movable longitudinally of said tubular member and transversely thereof for drawing the loop over the end of said tubular member while the ends of the binder are held by said gripper.

In testimony whereof I affix my signature in presence of two witnesses.

ARTHUR J. COON.

Witnesses:
   E. D. ANTHONY,
   JOHN MULICK.